(12) United States Patent
Nguyen et al.

(10) Patent No.: US 7,870,106 B1
(45) Date of Patent: Jan. 11, 2011

(54) CLIENT SIDE CACHING IN A GLOBAL FILE SYSTEM

(75) Inventors: Tung M. Nguyen, Cupertino, CA (US); Richard Au, Woodside, CA (US); Eric Pouyoul, San Francisco, CA (US)

(73) Assignee: Panta Systems, Inc., Cupertino, CA (US)

( * ) Notice: Subject to any disclaimer, the term of this patent is extended or adjusted under 35 U.S.C. 154(b) by 869 days.

(21) Appl. No.: 11/346,874

(22) Filed: Feb. 2, 2006

Related U.S. Application Data

(63) Continuation-in-part of application No. 11/026,622, filed on Dec. 30, 2004.

(51) Int. Cl.
*G06F 17/00* (2006.01)

(52) U.S. Cl. .................. 707/694; 707/966; 709/201; 709/202; 709/222

(58) Field of Classification Search .......... 707/10, 707/822, 694, 966, 899; 709/220, 222, 203, 709/201, 221
See application file for complete search history.

(56) References Cited

U.S. PATENT DOCUMENTS

| | | | |
|---|---|---|---|
| 5,175,852 A * | 12/1992 | Johnson et al. ................ 707/8 |
| 6,101,576 A | 8/2000 | Kobayashi et al. | |
| 6,502,238 B1 | 12/2002 | Pavan et al. | |
| 6,751,658 B1 * | 6/2004 | Haun et al. ................. 709/222 |
| 7,269,664 B2 * | 9/2007 | Hutsch et al. ............... 709/246 |
| 7,334,157 B1 * | 2/2008 | Graf et al. ..................... 714/13 |
| 7,475,274 B2 | 1/2009 | Davidson | |
| 2002/0083120 A1 * | 6/2002 | Soltis ......................... 709/200 |
| 2003/0126242 A1 * | 7/2003 | Chang ......................... 709/222 |
| 2005/0131962 A1 * | 6/2005 | Deshpande ................. 707/201 |

\* cited by examiner

*Primary Examiner*—Mohammad Ali
*Assistant Examiner*—Thuy (Tiffany) Bui

(57) ABSTRACT

Client node caching in a global file service. A client node receives a leaf image from a remote storage node storing a base image that is read-only accessible to the client node. The leaf image has a portion of the base image modified by the client node. The client node stores the leaf image in a cache on the client node. Unmodified portions of the base image are accessed from the remote storage node. Modified portions of the base image are accessed from the cache. The leaf images may comprise a branch modification log having portions of the base image modified by the client node and a metadata structure. The metadata structure has pointers to the modified data in the branch modification log and pointers to data unmodified by the client node in the base image. Alternatively, the leaf images may comprise a change volume for changes made to the base image by the client node.

16 Claims, 9 Drawing Sheets

700

Create a root file system comprising a root image of an application
710

↓

Create leaf images that are configured to record changes to the root image of the application
720

↓

Create a directory configured to access instances of the application for respective compute nodes
730

↓

Provide the compute nodes with respective instances of the application
740

↓

Modify one of the leaf images in response to a corresponding compute node's access to its instance of the application
750

Figure 7

CLIENT SIDE CACHING IN A GLOBAL FILE SYSTEM

RELATED APPLICATION

This application is a continuation-in-part of U.S. patent application Ser. No. 11/026,622, entitled, "Branching Store File System," by Nguyen et al., filed Dec. 30, 2004.

FIELD OF THE INVENTION

Embodiments of the present invention relate to the field of networked computing. Specifically, embodiments of the present invention relate to a global file service in a multi-computer system.

BACKGROUND ART

In large-scale systems, a trend in software deployment is to centralize Operating System (OS) software image management on a globally accessible file system with stateless computing nodes. The compute nodes are activated with the distributed application by either diskless booting protocols or remote software installation to local storage.

One approach to software image management is to use a single image with global process dispatch to lightweight OS node computing environments. A second approach is to dedicate one image per compute node.

Neither of the two general approaches provides fault isolation between different instances of the distributed application while being scalable and efficient. For example, the single OS image approach does not provide fault isolation between different instances of the distributed application.

Moreover, a single OS image results in a network bottleneck that becomes worse as the size of the system grows. Typically, clients send a huge number of requests over the network to the master node. In some conventional systems the client node must send a request over the network to obtain a file name even if no file data is presently desired. Moreover, in some conventional systems, if the server is down, the client is essentially unable to continue to run the distributed application.

SUMMARY OF THE INVENTION

Client node caching in a global file service is disclosed. In one embodiment in accordance with the present invention, a client node receives a leaf image from a remote storage node storing a base image that is read-only accessible to the client node. The leaf image has a portion of the base image modified by the client node. The client node stores the leaf image in a cache on the client node. Unmodified portions of the base image are accessed from the remote storage node. Modified portions of the base image are accessed from the cache.

In one embodiment, an instance of a distributed program for the client node is derived from the remotely stored base image and the leaf image.

In one embodiment, the leaf images comprise a branch modification log having portions of the base image modified by the client node and a metadata structure. The metadata structure has pointers to the modified data in the branch modification log and has pointers to data unmodified by the client node in the base image.

In another embodiment, the leaf images comprise a change volume having changes made to the base image by the client node.

Another embodiment of the present invention is a system for client side caching in a global file system. The system has a storage node with a file system with a base image that is read-only accessible by client nodes. The file system also has leaf images that comprise modified portions of the base image for respective ones of the client nodes. The storage node has a manager that controls access to the root file system and to the leaf images. The system further has a plurality of the client nodes. A client node comprises a cache and a filter. The cache stores a leaf image for portions of the base image modified by the client node. The filter contacts the manager to access portions of the base image unmodified by the client node and accesses the cache for the portions of the base image modified by the client node.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 7 is flowchart illustrating a process of a branching file system, in accordance with an embodiment of the present invention.

DETAILED DESCRIPTION OF THE INVENTION

Figure 1:
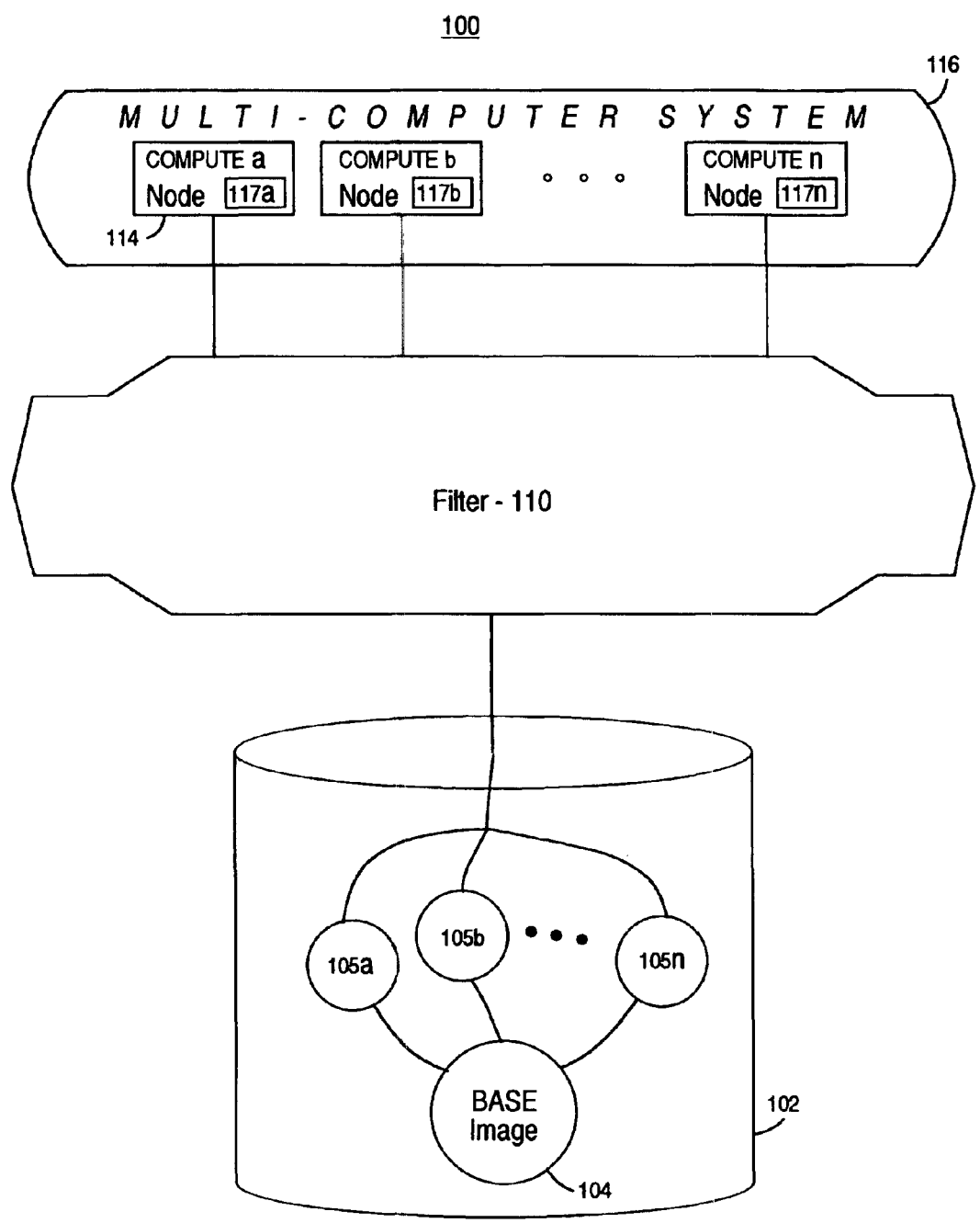
FIG. 1 is a diagram of a branching store file system with leaf images, in accordance with an embodiment of the present invention.

In the following detailed description of embodiments of the present invention numerous specific details are set forth in order to provide a thorough understanding of the present invention. However, it will be recognized by one skilled in the art that the present invention may be practiced without these specific details or with equivalents thereof. In other instances, well-known methods, procedures, and components have not been described in detail as not to unnecessarily obscure aspects of the present invention.

Notation and Nomenclature

Some portions of the detailed descriptions that follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving" or "modifying" or "generating" or "storing" or "caching" or "computing" or "accessing" or "determining" or "storing" or "transferring" or "initializing" or "selecting" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention provide methods and systems for client side caching in a multi-compute node environment. Embodiments of the present invention reduce or alleviate network bottlenecks associated with client node's accessing its instance of data over a network. Embodiments of the present invention provide methods and systems for distributed application deployment in a multi-compute node environment. Embodiments of the present invention provide isolation and fault containment typical of multiple OS image approaches with operation performance typical of a single OS image approach. Furthermore, embodiments of the present invention allow the flexibility to customize the application environment that is unmatched by either approach. Embodiments of the present invention are highly scalable. Embodiments of the present invention provide these advantages and others not specifically mentioned above but described in the sections to follow.

Branching Store

FIG. 1 is a diagram of branching store system 100 in accordance with an embodiment of the present invention for enabling distributed application deployment in a multi-computer system 116. The branching store system 100 has a number of compute nodes 114 coupled to file system 102 through a filter 110. To the compute nodes 114 it appears that they have access to their own version of a distributed application 117. However, the file system 102 does not store a separate and complete version of the distributed application 117 for each compute node 114.

The branching store system 100 has a file system 102 containing a base image or instance 104 of a distributed application. The base instance 104 is not changed by compute nodes 114. For example, the compute nodes 114 have read-only access to the base image 104. However, if changes are made to the base image 104, those changes are essentially instantaneously known to the compute nodes 114.

Moreover, the file system 102 has a number of leaf images 105. For example, each compute node 114a-n has a corresponding leaf image 105a-n. A given leaf image 105 describes changes made by the respective compute node 114 to its instance of the distributed application. Thus, when a compute node (e.g., node 114a) make changes involving the base image 104, modifications are made to that compute node's leaf image (e.g., leaf image 105a). A leaf image 105 may comprise versions of entire files of the distributed application; however, this is not required. In one embodiment, the changes in the leaf image 105 are performed on a data block-by-data block basis. In another embodiment, the changes in the leaf image 105 are performed on a file-by-file basis. There may also be intermediate images (not depicted in FIG. 1) between the base image 104 and the leaf images 105.

A compute node 114 mounts its instantiation of the distributed application via the filter 110. The filter 110 determines what leaf image 105 is needed for portions of the distributed application that the compute node 114 has changed. The filter 110 also locates the portions of the distributed application that are not changed by the compute node 114. These portions may reside in the base image 104. There may also be intermediate images (not depicted in FIG. 1) comprising versions of the base image 104 from which a compute node's instance of the distributed application is derived. Further, the filter 110 creates new leaf images 105 when a compute node 114 makes changes to its instantiation of the distributed application.

By maintaining a separate instance of the distributed application for each compute node 114, embodiments of the present invention provide fault isolation between instances of the distributed application. Furthermore, by recording only changes in the leaf images, embodiments of the present invention conserve system resources. Furthermore, updates to the base image are provided to the compute nodes nearly instantaneously.

Figure 2:
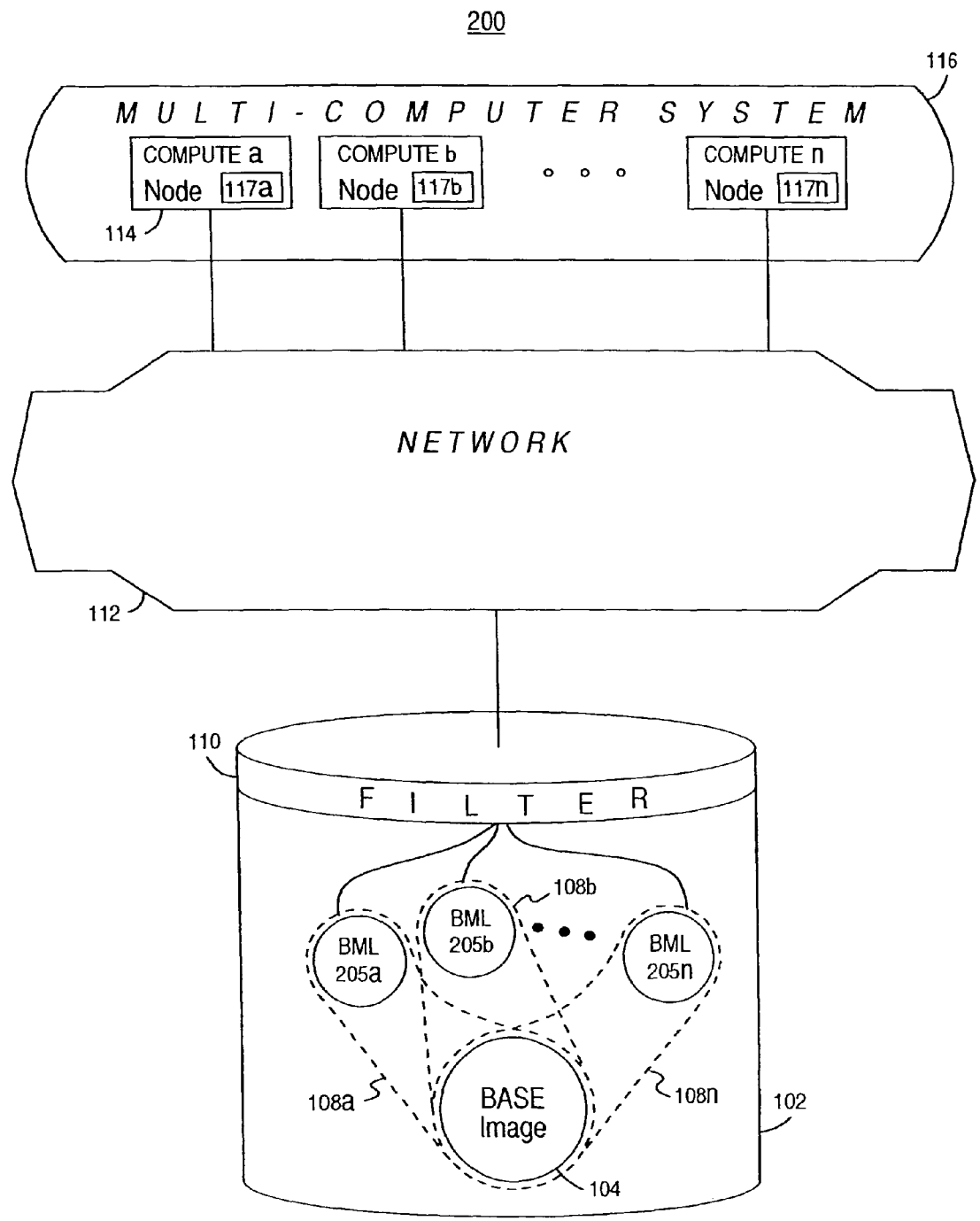
FIG. 2 is a diagram of a branching store file system using branch modification logs, in accordance with an embodiment of the present invention.

FIG. 2 is a diagram of branching store system 200 in accordance with an embodiment of the present invention in which a branch modification log is used to record changes to the base instance of the distributed application. The system 200 has a number of compute nodes 114a-n coupled to network 112 that have access to a file system 102 through a filter 110. To the compute nodes 114a-n, it appears that they have access to their own version of a distributed application 117a-n, respectively. However, the file system 102 does not store a separate and complete version of the distributed application 117 for each compute node 114.

The branching store system 100 has a file system 102 containing a base image or instance 104 of a distributed application (e.g., a base operating system). Briefly, the base image 104 contains data and metadata for the base image 104 of the distributed application. The base image 104 is not changed by compute nodes 114. For example, the compute nodes 114 have read-only access to the base image 104. However, if changes are made to the base image 104, those changes are essentially instantaneously known to the compute nodes 114.

Moreover, the file system 102 has a number of branch modification logs 205a-n. For example, each compute node 114a-n has a corresponding branch modification log 205a-n. The branch modification log 205 is one embodiment of a leaf image (FIG. 1, 105). A given branch modification log (e.g., 205a) describes changes made by the respective compute node (e.g., 114a) to its instance of the distributed application (e.g., 117). Thus, when a compute node 114 make changes involving the base image 104, modifications are made to that compute node's branch modification log 205. A compute node's instance is thus defined by at least a portion of the base image 104 and its branch modification log 205. This is indicated by the groupings 108a-n. It will be understood that a compute node's instance of the distributed application does not typically include all of the grouping 108. For example, some of the base image 104 may be copied into a branch modification log 205 and modified therein.

A branch modification 205 contains metadata and data for a respective compute node's instance of the distributed application. However, the data in a given branch modification log 205 only reflects differences between the data in the base image 104 and the given compute node's instance of the distributed application, in this embodiment. A compute node 114 mounts its instance of the distributed application as pointed to by its branch modification log 205. For example, a compute node 117a accesses the base image 104 for data that is unchanged and accesses its branch modification log 205a for data that the compute node 114a has changed. Thus, this embodiment traverses inodes to determine the location of data for a compute node's instance of a distributed application.

Figure 3:
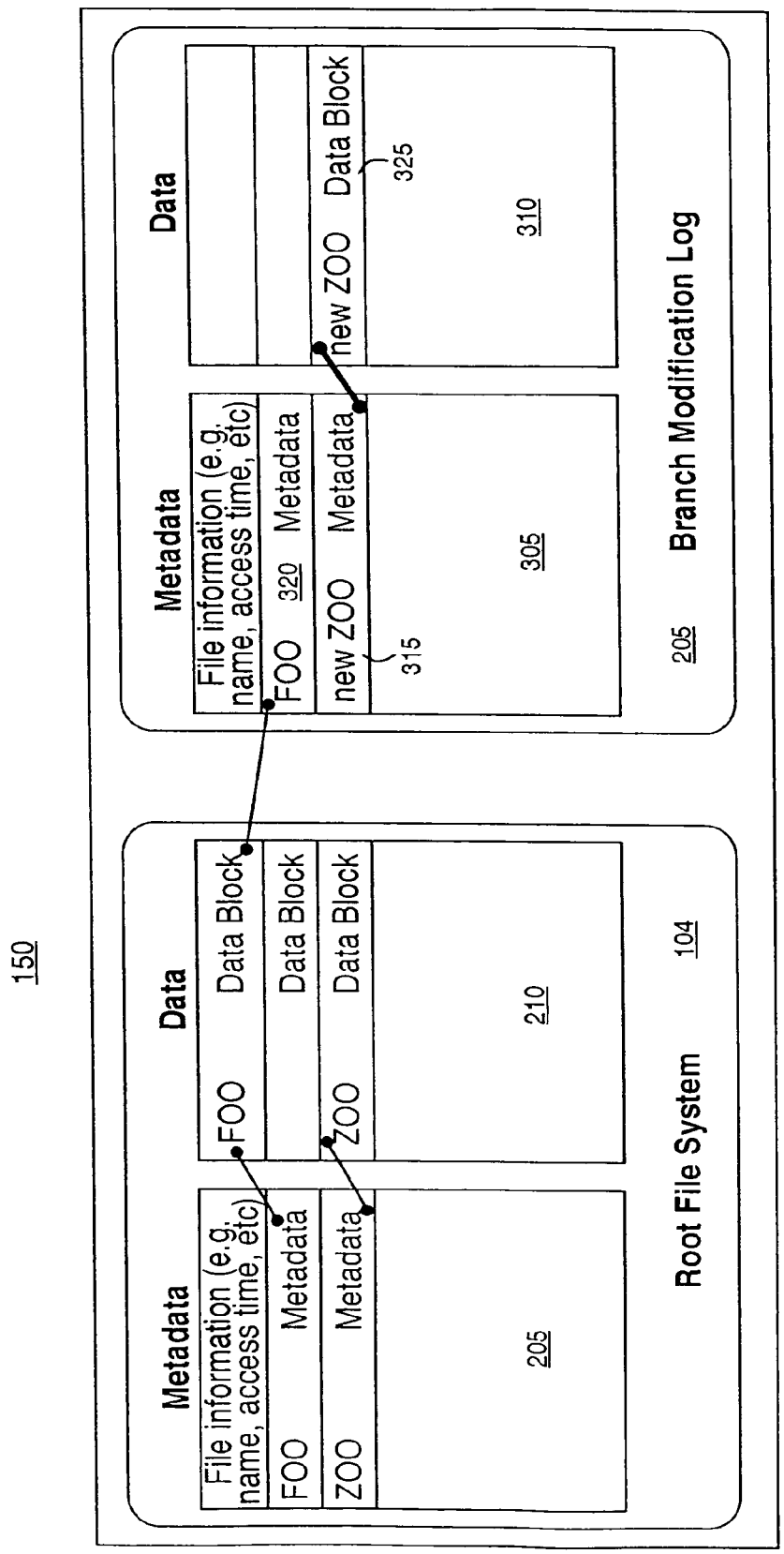
FIG. 3 illustrates an exemplary branching store architecture using branch modification logs, in accordance with an embodiment of the present invention.

FIG. 3 illustrates an exemplary branching store architecture 150, in accordance with an embodiment of the present invention. The exemplary branching store architecture 150 may be used in the system depicted in FIG. 1 or FIG. 2, although systems 100 and 200 are not limited to this architecture 150. The branching store architecture 150 has a root file system 104 (also referred to herein as a base image) and a branch modification log 205. The branch modification log 205 is one embodiment of a leaf image (FIG. 1, 105). Typically, there will be many branch modification logs 205, such that one is available for each compute node in the system.

The root file system 104 has a root metadata structure 205 and a root data structure 210. Entries in the root metadata structure 205 point to associated entries in the root data structure 210. The root data structure 210 comprises the base instance of the distributed application. Neither the root data structure 210 nor the root metadata structure 205 is modified by compute nodes. However, a system management node or the like may modify the root file system 104, such that changes to the distributed application are easily and rapidly deployed to compute nodes.

The branch modification log 205 has a branch data structure 310 comprising modified data reflecting changes made to an instance of the root data structure by a compute node. For example, when a compute node makes changes to its instance of the distributed application data is added or modified in the branch data structure 310 for that compute node.

The branch modification log 205 also comprises a branch metadata structure 305 comprising unmodified entries 320 and modified entries 315. The modified entries 315 reflect changes made to the instance of the distributed application by the compute node. Thus, a modified entry 135 may be an entry that has a modification attribute attached to the entry. A modified entry 315 points to an associated modified data block 325. For example, if an entry has an attribute indicating that it is a modified entry, then inodes are followed to the correct block 325 in the branch data structure 310.

The unmodified entries 325 point to associated entries in the root data structure 210. For example, if an entry does not have an attribute indicating that it is a modified entry, then the file lookup is re-directed such that inodes are followed to the root data structure 210.

The instance of the distributed application is thus defined by the branch metadata structure 305, wherein an unmodified portion of the distributed application resides in the root data structure 210 and a modified portion of the distributed application resides in the branch data structure 310.

Figure 4:
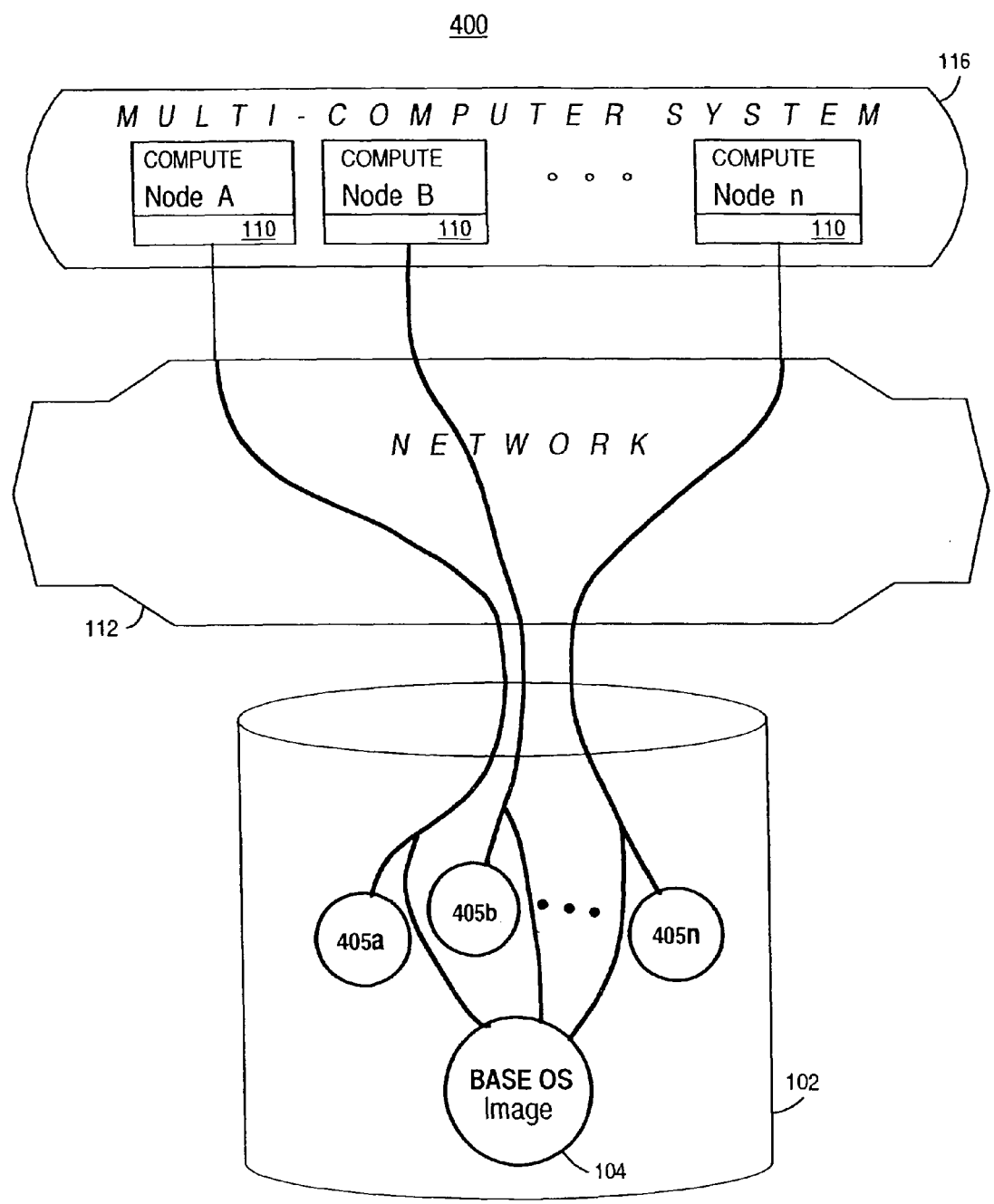
FIG. 4 is a diagram of branching store file system employing copy on write to change volumes, in accordance with an embodiment of the present invention.

FIG. 4 is a diagram of branching store system 400 in accordance with an embodiment of the present invention in which a copy on write to change volumes 405 are used to record changes to the base instance of the distributed application. Changes to a compute node's instance of the distributed application, may also be kept as a database referred to as a change volume 405.

The file system 102 comprises a base image 104 of a distributed application 104 (e.g., a base OS) and a number of change volumes 405a-n. When a compute node 114 performs a write operation on a file, the entire original file is copied from the root image 104 into the change volume 405, if the file does not already exist in the change volume 405. The write operation is then performed on the copy in the change volume 405.

When a compute node 114 mounts the distributed application, the compute node 114 mounts at least a portion of the base image 104 and the change volume 405. Access to files in a compute node's instance of the distributed application may proceed by first determining if the file exists in the compute node's 114 change volume 405, then determining if the file is in the base image 104.

There is a filter 110 at each compute node 114, in this embodiment. Alternatively, there could be a single filter 110 at the file system 102. The implementation of the filter 110 in this embodiment may be different than the implementation of the filter 110 of system 200 of FIG. 2.

Application Groups

An embodiment of the present invention provides for application groups (AG). An AG is a way to provide a group of compute nodes their own instantiation of an application, while allowing versions of the application to be frozen from time to time. Thus, an archive of the application is created.

At creation time, an AG comprises the original root file system. A number of leaf nodes or images are created to match the desired capacity demand of the AG. The leaf images can be created very quickly and require very little storage because the leaf image reflect changes to the root instance. In one embodiment, the leaf images comprise BMLs. In another embodiment, the leaf images comprise change volumes.

Figure 5:
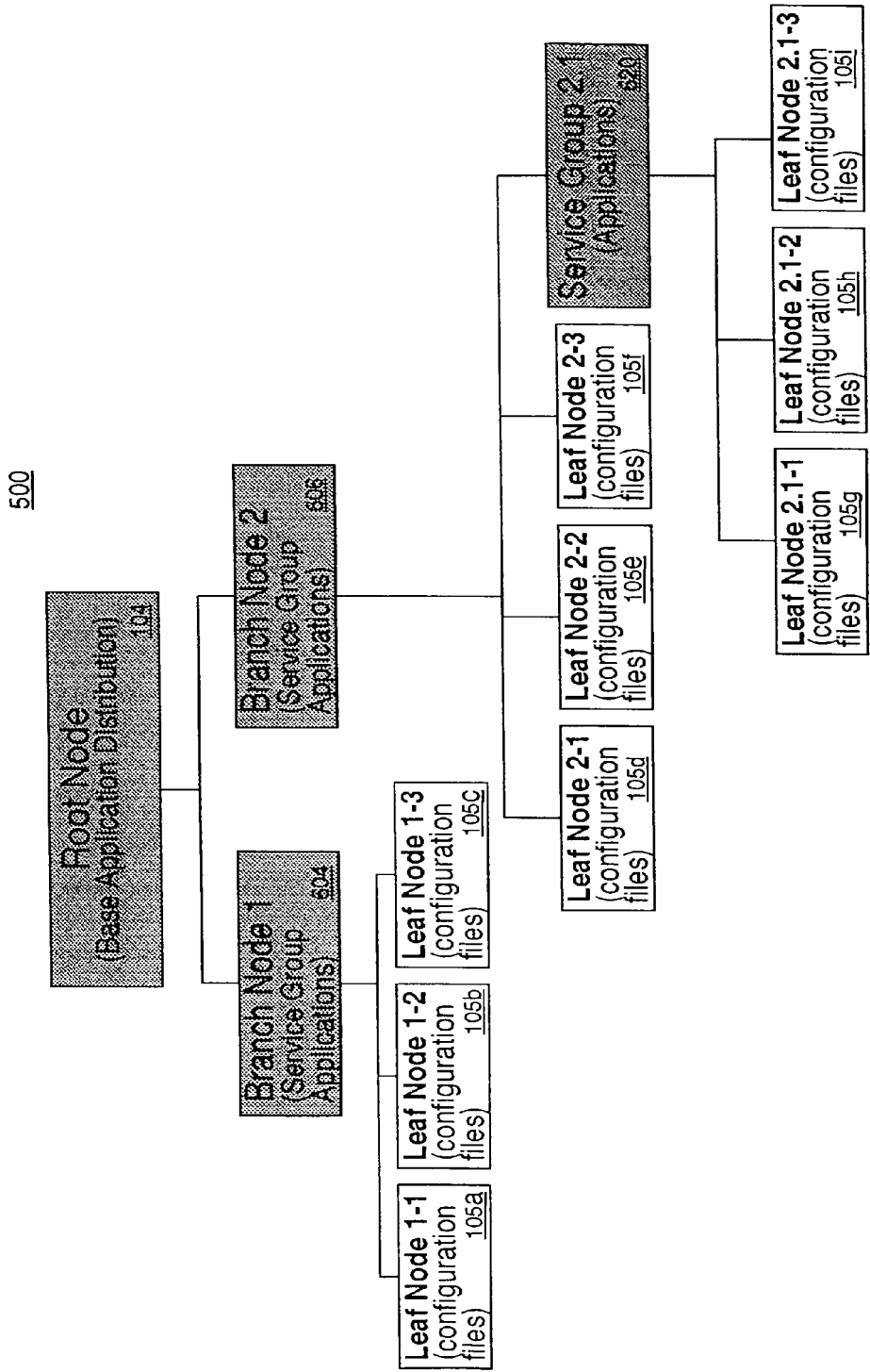
FIG. 5 is a tree structure that illustrates a branching file system, in accordance with an embodiment of the present invention.

FIG. 5 is a tree structure 500 that illustrates a branching file system, in accordance with an embodiment of the present invention. Some nodes are read-only, others are read-write-modify. A node may change from read-write-modify to read-only. For example, creating a new edition of the AG may be accomplished by freezing a current leaf image structure and creating a new set of leaf images. The frozen node is then made read-only. Referring now to FIG. 5, the root node 104 (also referred to herein as a base image) is the base distributed application. As previously discussed, the root node 104 is not modified by compute nodes for which the application is distributed.

The first level of the exemplary tree structure 500 comprises first branch node 604 and branch node 606, which represent two different application service groups. Compute nodes have read only access to the service group applications represented by branches 604 and 606. Branch node 604 has three leaf nodes 105a, 105b, 105c. The leaf nodes 105 may be for configuration files, for example. The compute nodes can boot off from the configuration files. The leaf nodes are also referred to herein as leaf images. In one embodiment, the leaf nodes 105 are change volumes. In another embodiment, the leaf nodes 105 are branch modification logs.

The branch node 606 also has three leaf nodes 605*d*, 605*e*, 605*f*, which are analogous to the leaf nodes 605*a-c* associated with branch node 604. However, branch node 606 also has a service group 620, which reflects a change to the application. The service group 620 has leaf nodes 605*g*, 605*h*, and 605*i*.

Figure 6:
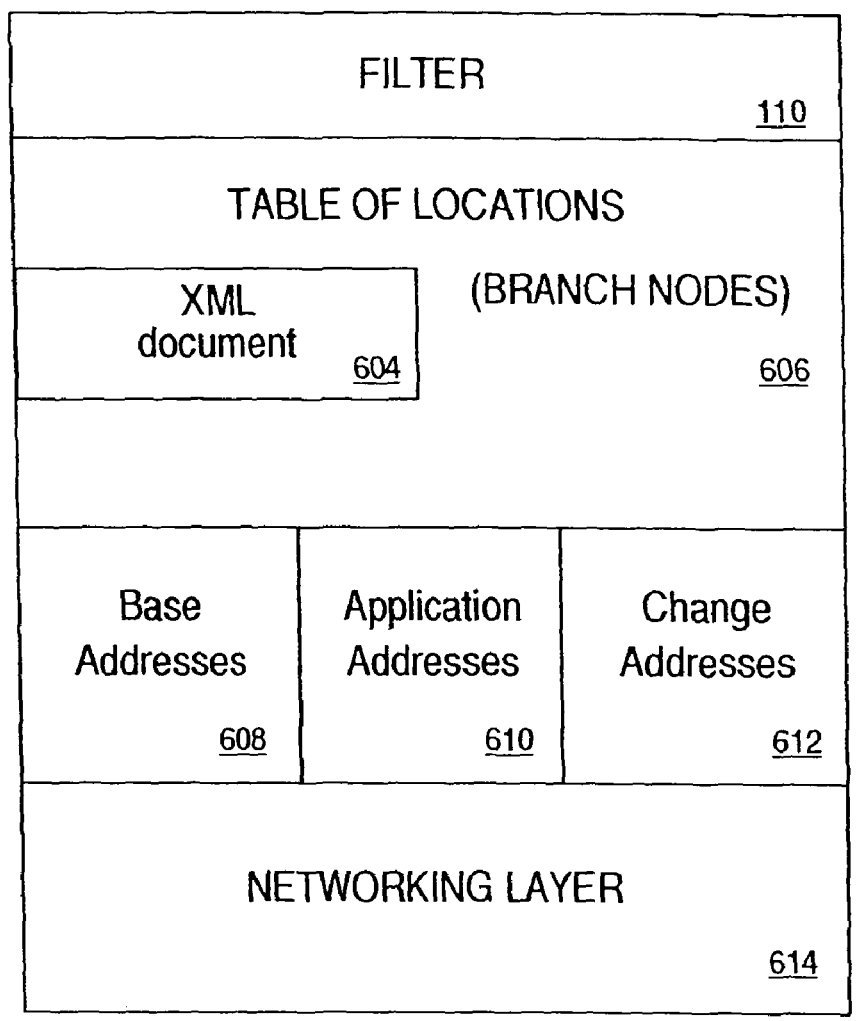
FIG. 6 is diagram illustrating modules and structures of a file system, in accordance with an embodiment of the present invention.

FIG. 6 is diagram illustrating components of a file system 600, in accordance with an embodiment of the present invention. The file system 600 may be used in a copy-on-write embodiment, such as the system 400 depicted in FIG. 4. However, it will be understood that the system 400 if FIG. 4 is not limited to file system 600. The filter 602 presents the view to the compute nodes of a regular file system. In one embodiment, the filter presents the view of a UNIX file system.

The file system 600 also has a table of locations 606, which indicates the locations of branch nodes. The file system has an XML document that indicates the locations. The XML document can be sent to compute nodes.

Also stored are base addresses 608, application addresses 610, and change addresses 612. The file system has a networking layer 614 for interfacing on the network (FIG. 4, 112).

FIG. 7 is flowchart illustrating a process 700 of branching file system access, in accordance with an embodiment of the present invention. Steps of process 700 may stored as instructions on a computer readable medium and executed on a computer processor. Step 710 is creating a root file system comprising a root image of an application.

Step 720 is creating leaf images that are configured to record changes to the root image of the application. The leaf images comprise branch modification logs in one embodiment. In another embodiment, the leaf images comprise change volumes.

Step 730 is creating a directory configured to access instances of the application for respective compute nodes. A respective compute node's application instance comprises at least a portion of the root image and the respective compute node's leaf image.

Step 740 is providing the compute nodes with respective instances of the application. Step 740 may comprise a filter determining which files or data blocks are needed for a given compute node's instance of the application.

Step 750 is modifying one of the leaf images in response to a corresponding compute node's access to its instance of the application. The modifying of the leaf image may include copying a file from the root image to the first leaf image and then modifying the file in the first leaf image. However, this step is not so limited. The modifying may also be performed by copying one or more data blocks from the root image to a leaf image, and modifying the data block in the leaf image. It will be appreciated that the file or data block being modified may already exists in the leaf image, in which case it does not need to be copied from the base image before modification.

Client Side Caching

Figure 8:
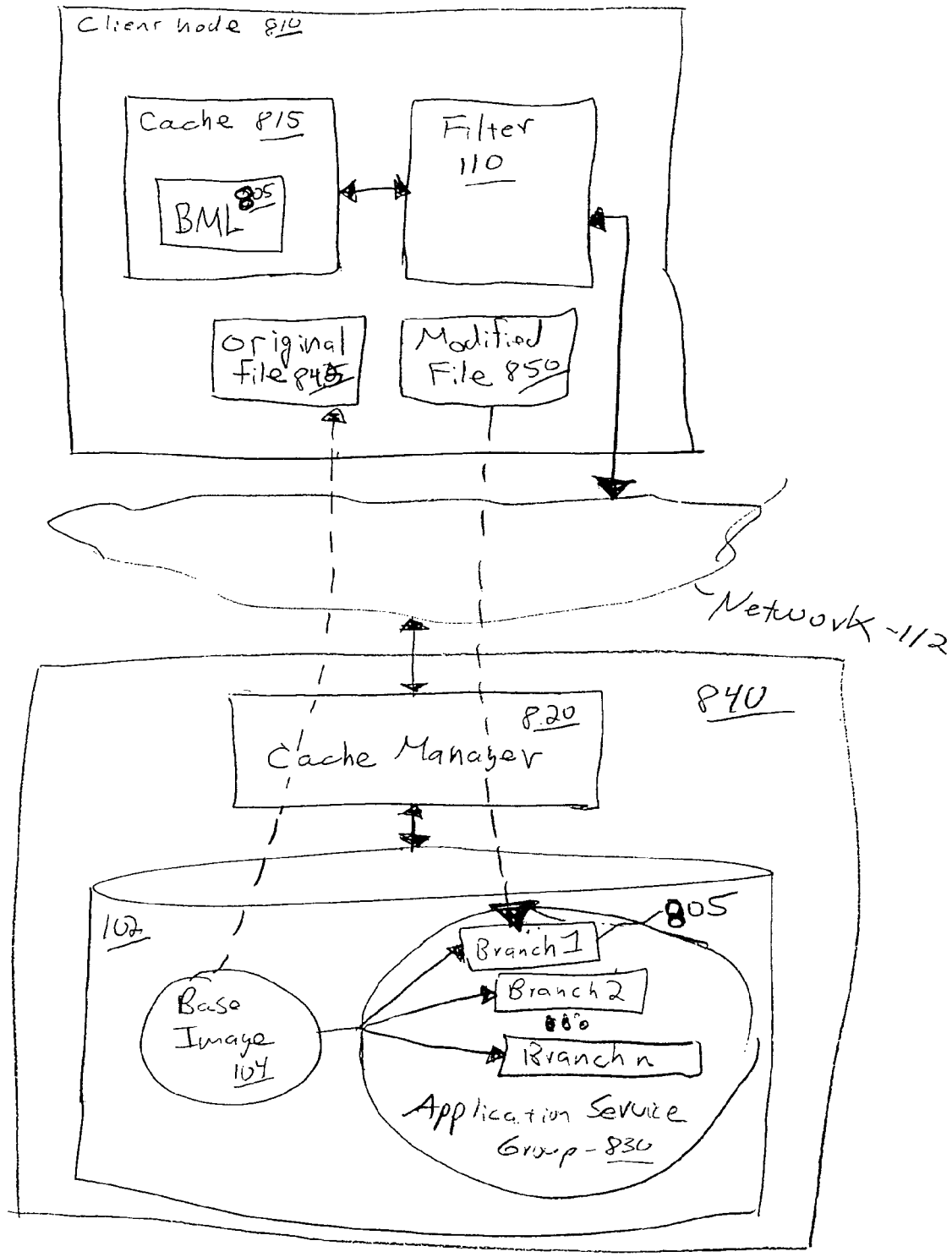
FIG. 8 is a diagram of an architecture of a global file service, in accordance with an embodiment of the present invention.

FIG. 8 is a diagram of a system 800 for a global file service with client side caching, in accordance with an embodiment of the present invention. For convenience of illustration only one client node 810 is depicted, although the system supports many client nodes 810. The system 800 has a storage node 840 having a file system 102 to which the client node 810 accesses via the network 112. This embodiment of the present invention reduces or alleviates problems associated with conventional techniques in which the network 112 serves as a bottleneck. For example, some conventional systems require the client nodes 810 to frequently make requests over a network 112. In contrast, the client node 810 caches certain information to reduce the need for network access. The client node 810 can even disconnect from the network while continuing to execute a distributed program and make changes to the program, which are later transferred to the storage node 840 for persistent storage, in accordance with an embodiment of the present invention.

The file system 102 contains a base image or instance 104. In one embodiment, the base image comprises a distributed application. The base image 104 is not changed by client node 810. For example, the client node 810 has read-only access to the base image 104. Moreover, the file system 102 has an application service group 830, which describes changes made to the base image by each client node 810. In one embodiment, the changes are described in a branch modification log. An exemplary branch modification log embodiment is depicted in FIG. 2 and FIG. 3, and described in conjunction with FIG. 2 and FIG. 3 herein. In another embodiment, the client changes are described in stored in change volumes. An exemplary change volume embodiment is depicted in FIG. 5, and described in conjunction with FIG. 5 herein.

In a typical scenario, the client node 810 loads its branch 805 (e.g., branch modification log) when the client node 810 initializes. The client node 810 may store the branch modification log (BML) in the cache 815. The filter 110 accesses the cache manager 820 via the network 112 to perform the data transfer. The storage node 840 may have a root data structure that is read-only accessible by the client node 810. As described herein, the BML 805 may comprise a branch data structure with modified data reflecting changes made by said client node 810 to an instance of said root data structure. The BML 805 may further comprise a branch metadata structure comprising pointers to unmodified data in the root data structure on the storage node 840 and pointers to the modified data in said branch data structure.

When the client node 810 desires access to data (e.g., a file or a data block), the filter 110 accesses the branch metadata structure to determine if the desired data is cached on the client node 810. If the desired data is not cached, the filter 110 accesses the cache manager 820 to transfer the desired data. For example, because unmodified data are not part of the BML 805, the original file 845 is transferred from the base image 104 in response to a client node request. It will be appreciated that rather than transferring an entire original file from the base image 104, an original (e.g., unmodified by the client node) data block may be transferred from the base image 104.

The client node 810 is free to modify the original file 845 to generate the modified file 850, which may be cached at the client node 810. Moreover, when it is convenient for the client node 810 to do so, the client node 810 transfers the modified file 850 to the storage node 840, which updates the BML 805 on the storage node 840 to synchronize the client image with the storage node image. The filter 110 controls the transfer such that applications running on the client node 810 are not aware of the transfers. To the applications executing on the client node 810 it appears that they have their own version of a distributed application, in accordance with one embodiment.

Because a metadata structure is cached on the client node 810, metadata access is local, in one embodiment. Thus, the client node 810 can look up or change a file name without performing a network access.

In one embodiment, the client node 810 is a cellular telephone or the like. The cellular telephone may use the network 112 to connect to a server (e.g., storage node 840), which provides for additional storage or cellular telephone data, such as photographs, etc. The cached metadata structure (e.g., BML 805) describes the location of all the data. If the cellular telephone loses the network connection, the cellular telephone can continue to generate and modify data. When it is convenient to re-connect to the network 112, the cellular telephone can transfer the data to the server.

In one embodiment, the data on the storage node 840 is replicated on other nodes. For example, the system 800 may have several servers, each with a copy of the file system 102. If one server goes down, data transfers (both to and from the server) may be re-directed to a different server.

Embodiments of the present invention are very beneficial for applications in which the client node 810 accesses a dataset, performs calculations thereon, modifies the dataset, and then stores the modified dataset. For such applications, embodiments of the present invention alleviate or reduce network transfer bottlenecks. Furthermore, the client node 810 can disconnect from the network 112 for times other than the initial data transfer to the client node and the final transfer to the storage node.

Figure 9:
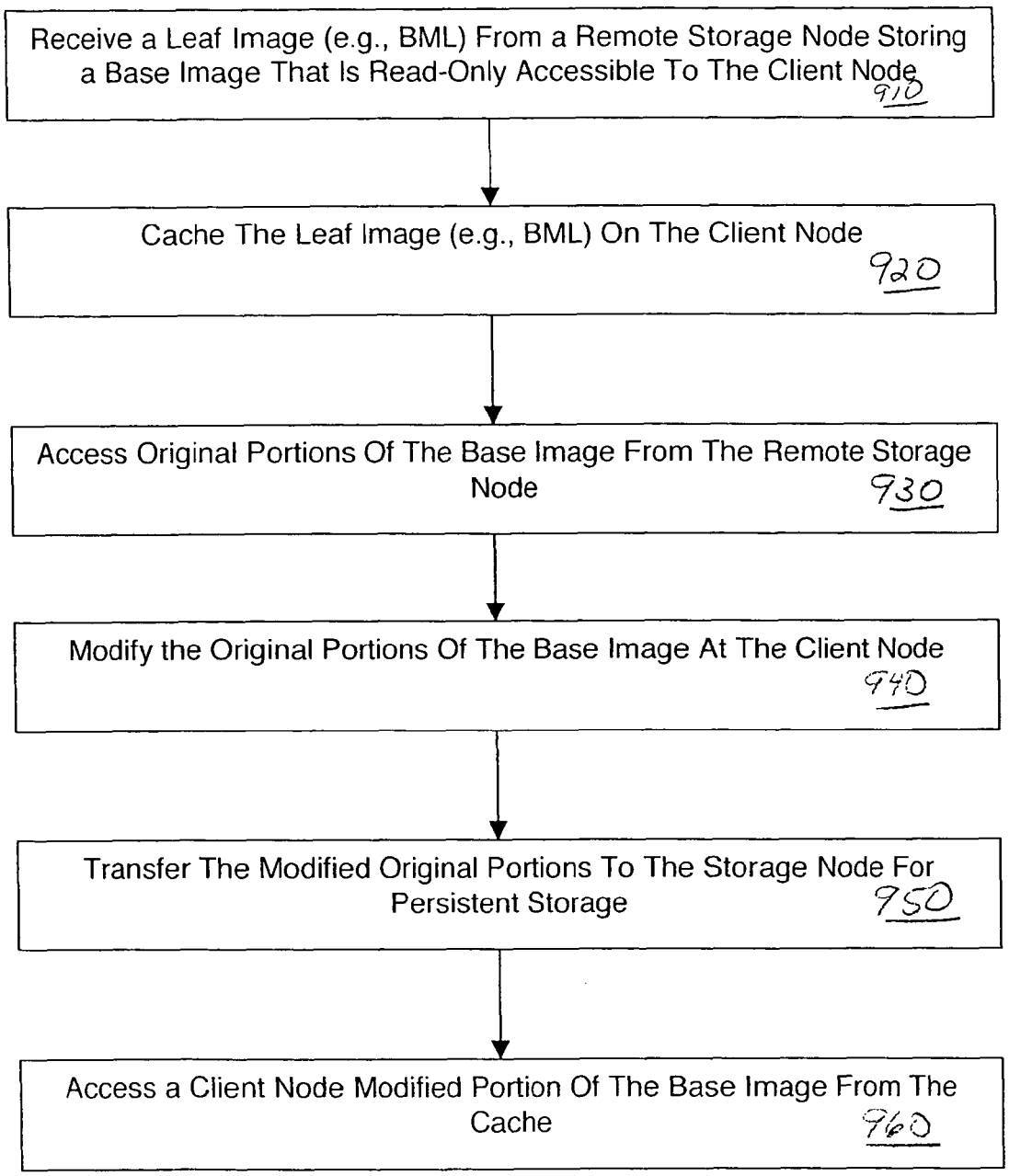
FIG. 9 is flowchart illustrating a process of client node caching in a global file service, in accordance with an embodiment of the present invention.

FIG. 9 is flowchart illustrating a process 900 of client node caching in a global file service, in accordance with an embodiment of the present invention. Process 900 is not limited to the particular order in which the steps are described. Step 910 is the client node receiving a leaf image from a remote storage node storing a base image that is read-only accessible to said client node. In one embodiment, the leaf image comprises a branch modification log having portions of said base image modified by said client node. The leaf image also has a metadata structure having pointers to said modified data in said branch modification log and having pointers to data unmodified by said client node in said base image. In another embodiment, the leaf image comprises a change volume for changes made to the base image by the client node. In one embodiment, an instance of a distributed program for the client node is derived from the base image and the leaf image.

In step 920, the leaf image is cached on the client node. In one embodiment, a BML having a branch metadata structure is cached. In another embodiment, a change volume storing changes made to the base image by the client node is cached.

In step 930, portions of the base image (e.g., distributed program) that are unmodified by the client node are accessed from a remote storage node that stores the base image. The client node has a filter that handles the data transfers in a manner that is transparent to applications requesting the data.

Step 940 is modifying a copy of original portions of the base image at the client node. These portions may include, but are not limited to, a file or a data block. The modified original portions may be cached on the client node.

Step 950 is transferring the modified original portions to the storage node for persistent storage. Step 950 may include a cache manager at the storage node synchronizing the modified original portions with the currently stored instance for the client node.

Step 950 is accessing a client node modified portion of the base image from said cache.

The preferred embodiment of the present invention is thus described. While the present invention has been described in particular embodiments, it should be appreciated that the present invention should not be construed as limited by such embodiments, but rather construed according to the below claims.

What is claimed is:

1. A computer implemented method of client-side node caching in a global file service, said method comprising:
   receiving a plurality of separate and isolated peripheral nodes from a remote storage node storing a base image that is read-only accessible to a plurality of said client-side nodes, each said separate and isolated peripheral node only comprising a portion of said base image modified by a respective one of said client-side nodes, wherein each said separate and isolated peripheral node is received by said respective one of said client-side nodes when said respective client-side node initializes, wherein said remote storage node is coupled to said global file service via a network, and wherein said client-side nodes comprise compute devices;
   storing each said separate and isolated peripheral node in a cache on a respective one of said client-side nodes, wherein said cache comprises a physical storage device on said respective client-side node;
   accessing only unmodified portions of said base image for respective ones of said client-side nodes from said remote storage node; and
   accessing only said modified portions of said base image for respective ones of said client-side nodes from said caches, wherein a separate and isolated instance of a distributed program for a first of said client-side nodes is derived from said base image that said first client-side node has not modified and at least one of said separate and isolated peripheral nodes that correspond to said first client-side node.

2. The method of claim 1, wherein said peripheral node comprises a branch modification log comprising:
   portions of said base image modified by one of said plurality of client-side nodes; and
   a metadata structure having pointers to said modified data in said branch modification log and having pointers to data unmodified by said client-side node in said base image.

3. The method of claim 1, wherein said peripheral node comprises a change volume having changes made to a portion of said base image by one of said plurality of client-side nodes.

4. A method as recited in claim 1, further comprising:
   modifying a copy of a portion of said base image at said plurality of client-side nodes.

5. A method as recited in claim 4, further comprising:
   transferring said modified portion of said base image to said storage node for persistent storage.

6. A method as recited in claim 1, wherein said plurality of client-side nodes access said storage node via a network.

7. A method as recited in claim 1, further comprising said plurality of client-side nodes accessing a metadata structure on said plurality of client-side nodes, wherein said metadata structure is associated with said base image.

8. A computer implemented method of client-side node caching in a global file service, said method comprising:
   receiving a plurality of separate and isolated branch modification logs from a remote storage node coupled to a plurality of said client-side nodes, wherein each said separate and isolated branch modification log is received by respective ones of said client-side nodes when each said respective client-side node initializes, said remote storage node having a root data structure that is read-only accessible by said client-side nodes, each said branch modification log comprising:

a branch data structure comprising only modified data reflecting changes made by one of said respective client-side nodes to an instance of said root data structure; and a branch metadata structure comprising pointers to unmodified data in said root data structure on said remote storage node, and pointers to said modified data in said branch data structure;

storing said branch modification logs in a cache on said respective client-side nodes, wherein said cache comprises a physical storage device on said respective client-side nodes;

accessing only said unmodified data for respective ones of said client-side nodes from said remote storage node based on said pointers to said unmodified data, wherein said remote storage node is coupled to said global file service via a network, and wherein said client-side nodes comprise compute devices; and accessing only said modified data for respective ones of said client-side nodes from said cache based on said pointers to said modified data, wherein a separate and isolated instance of a distributed program for said respective client-side node comprises portions of said root data structure that said client-side node has not modified and said respective branch data structure.

9. A method as recited in claim 8, further comprising:
modifying said branch data structure at said plurality of client-side nodes; and caching said modified branch data structure on said respective client-side nodes.

10. A method as recited in claim 9, further comprising:
transferring said modified branch data structure to said storage node for persistent storage.

11. A method as recited in claim 8, wherein said plurality of client-side nodes access said remote storage node via a network.

12. A system for client side caching in a global file system, said system comprising:
a storage node comprising:
a file system comprising a base image that is read-only accessible by client-side nodes;
a plurality of separate and isolated peripheral nodes only comprising modified portions of said base image, a corresponding peripheral node for respective ones of said client-side nodes, wherein said separate and isolated peripheral nodes are received by said respective ones of said client-side nodes upon initialization of said respective client nodes, wherein said storage node is coupled to said global file service via a network, and wherein said client-side nodes comprise compute devices; and
a manager that controls access to said file system and to said peripheral nodes; and
a plurality of said client-side nodes, a client node comprising:
a cache that stores only a separate and isolated peripheral node for portions of said base image modified by said respective client-side node, wherein said cache comprises a physical storage device on said respective client-side node; and
a filter that contacts said manager to access only portions of said base image unmodified by said client-side node and accesses said cache for said portions of said base image modified by said respective client-side node, wherein a separate and isolated instance of a distributed program for a first of said client-side nodes is derived from said base image and at least one of said separate and isolated peripheral nodes that correspond to said first client-side node.

13. A system as recited in claim 12, wherein said peripheral node cached by said respective client-side node comprises a separate and isolated branch modification log, said branch modification log comprising:
portions of said base image modified by said respective client-side node; and
a metadata structure having pointers to said modified data in said cache and having pointers to data unmodified by said respective client-side node in said base image.

14. A system as recited in claim 12, wherein said separate and isolated peripheral nodes comprise change volumes for changes made to said base image by said respective ones of said corresponding client-side nodes.

15. A system as recited in claim 12, wherein said filter is able to transfer said portions of said base image modified by said client-side node to said storage node for persistent storage.

16. A system as recited in claim 12, wherein said client-side nodes access said storage node via a network.

* * * * *